(12) United States Patent
Aruga et al.

(10) Patent No.: US 6,288,538 B1
(45) Date of Patent: Sep. 11, 2001

(54) RECESS AND PROTRUSION SURFACE DETECTING DEVICE FOR AN OBJECT AND FOR COIN IDENTIFICATION

(75) Inventors: Fusayoshi Aruga; Mitsuo Yokozawa, both of Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/204,732

(22) Filed: Dec. 3, 1998

(30) Foreign Application Priority Data

Dec. 16, 1997 (JP) .................................................... 9-346805

(51) Int. Cl.$^7$ .............................. G07D 5/02; G01B 7/00; G01B 7/34; G01N 27/72
(52) U.S. Cl. ......................... 324/232; 324/235; 324/242; 194/320; 194/328
(58) Field of Search ....................... 324/207.17, 207.26, 324/226–232, 234, 235, 239, 241, 242, 243, 262; 73/159; 194/317, 318, 320, 328, 329; 235/449, 450; 209/567, 570; 33/501.03, 551, 552

(56) References Cited

U.S. PATENT DOCUMENTS

| | | | |
|---|---|---|---|
| 3,256,610 | * | 6/1966 | Brys .................................. 324/227 X |
| 3,585,495 | * | 6/1971 | Kubo et al. ....................... 324/234 X |
| 3,611,120 | * | 10/1971 | Forster .............................. 324/241 X |
| 3,617,874 | * | 11/1971 | Forster .................................. 324/241 |
| 3,857,089 | * | 12/1974 | Adler .............................. 324/207.17 |
| 4,288,747 | * | 9/1981 | Kawabata et al. ............... 324/243 X |
| 4,792,755 | * | 12/1988 | Huschelrath et al. ........... 324/242 X |
| 4,875,567 | * | 10/1989 | Fitton .................................... 194/318 |
| 5,262,722 | * | 11/1993 | Hedengren et al. ................. 324/242 |
| 5,457,382 | * | 10/1995 | Stein ............................... 324/262 X |
| 5,747,989 | * | 5/1998 | Kimura et al. ....................... 324/235 |

FOREIGN PATENT DOCUMENTS 60-53862 * 3/1985 (JP) ..................................... 324/232

* cited by examiner

Primary Examiner—Gerard R. Strecker
(74) Attorney, Agent, or Firm—Reed Smith LLP

(57) ABSTRACT

A surface profile detecting device comprises a plurality of bar-like cores disposed in a line with predetermined intervals in a predetermined disposing direction. Each core has tip ends that are arranged on a single plane and which face a surface of an object to be measured having recesses and protrusions in a magnetic field such that they are relatively movable in a direction orthogonal to said disposing direction. The detecting device also includes detecting arrangement provided in each of the bar-like cores for detecting changes in magnetic flux generated due to the uneven profile of the object to be measured. An A/D converting device is provided for A/D converting the output of the detecting arrangement with a predetermined timing. A memory is also provided for storing the output from the AND converting device. The uneven profile of the object to be measured in a predetermined range is detected from the data stored in the memory.

18 Claims, 8 Drawing Sheets

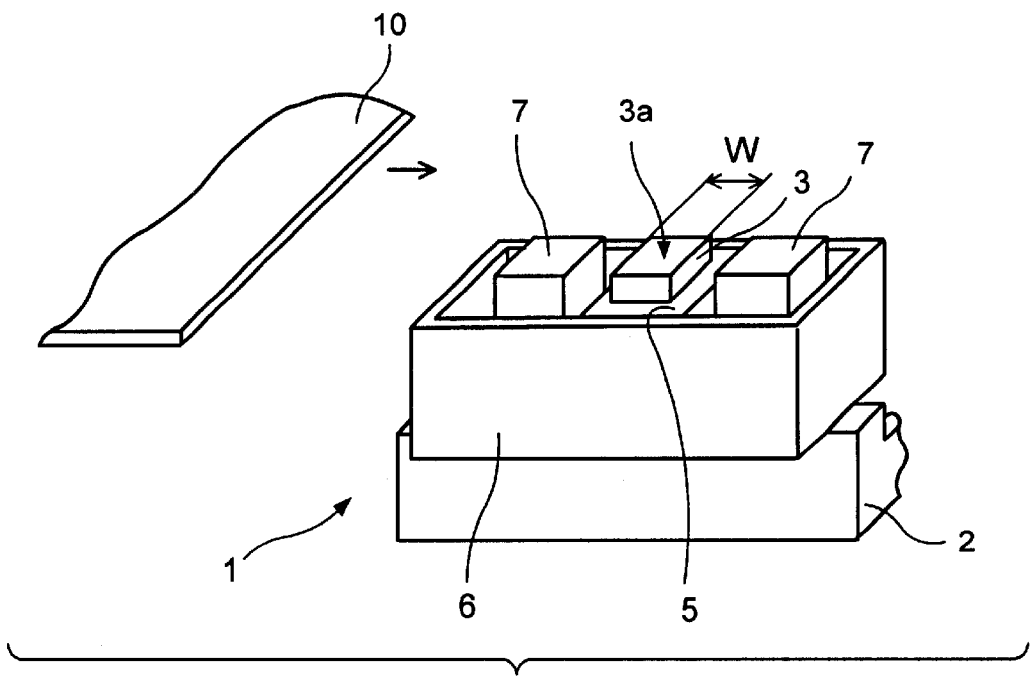
F I G. 4
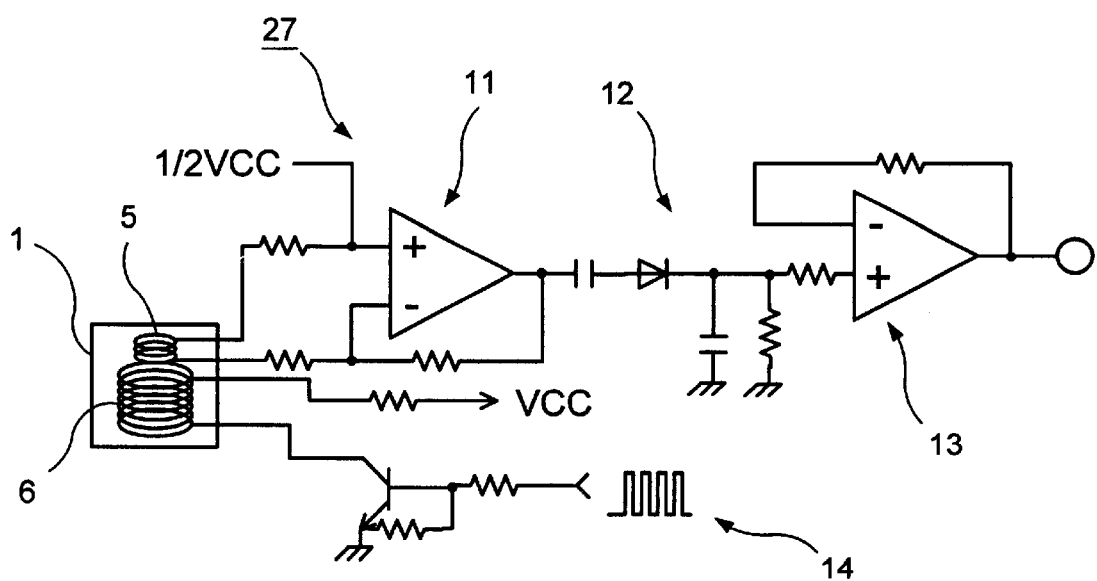
F I G. 5

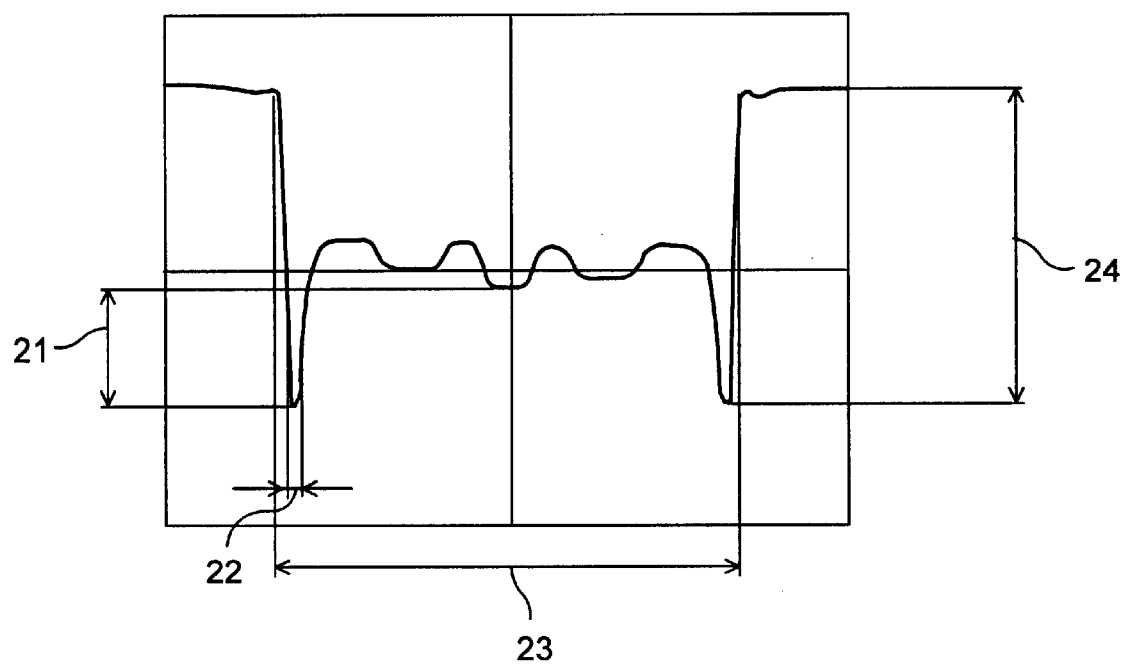
F I G. 6
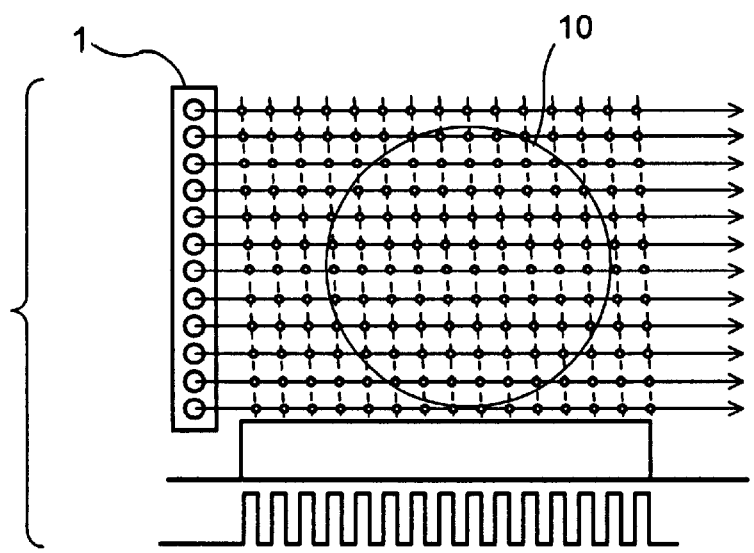
F I G. 7

FIG. 8a
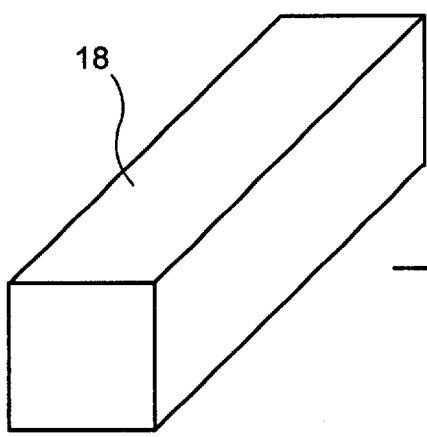
FIG. 8b
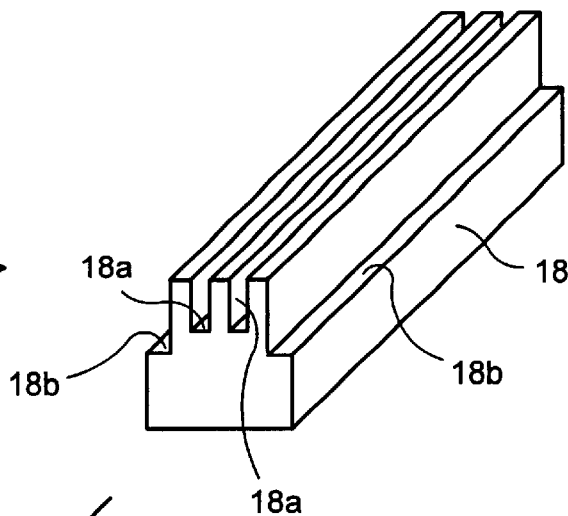
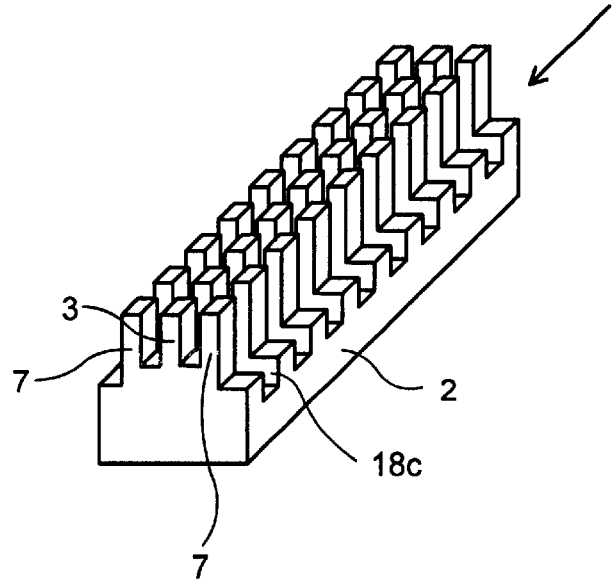
FIG. 8c

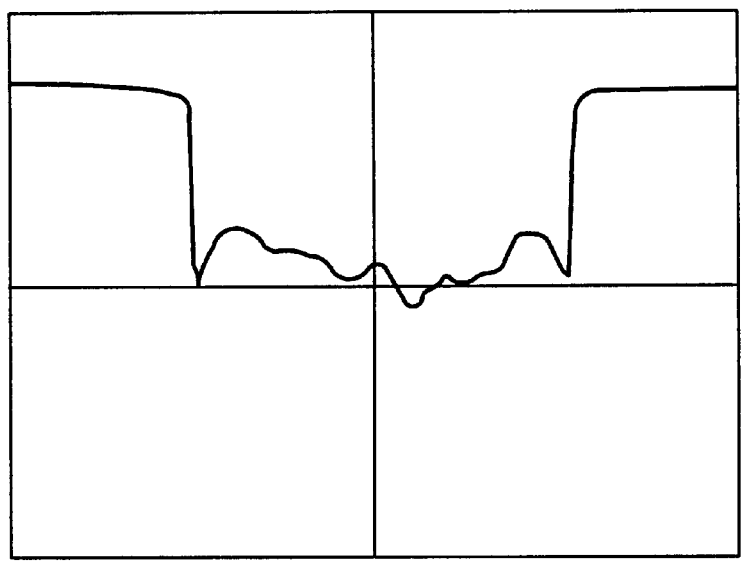
F I G. 11
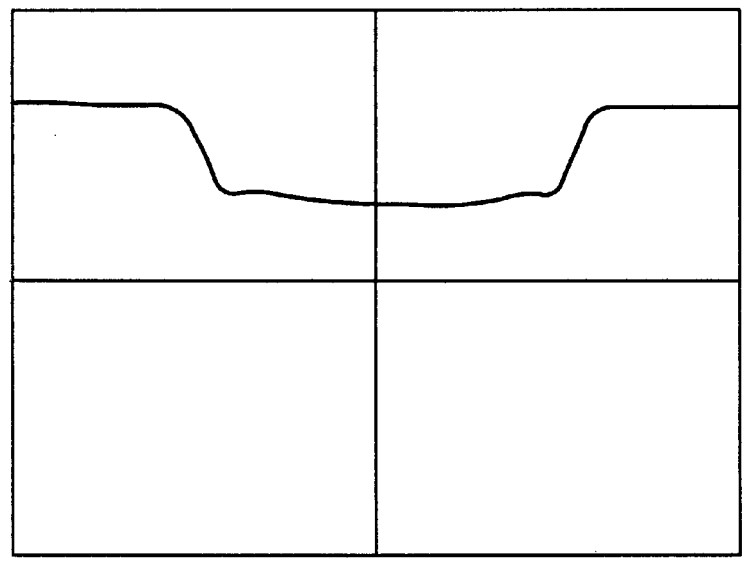
F I G. 12

RECESS AND PROTRUSION SURFACE DETECTING DEVICE FOR AN OBJECT AND FOR COIN IDENTIFICATION

BACKGROUND OF THE INVENTION a) Field of the Invention

The present invention relates to a surface profile detecting device for detecting an uneven surface profile of an object to be measured without contacting the surface based on changes in magnetic flux.

b) Description of the Related Art

Conventionally, a micrometer is one which can precisely measure an uneven surface profile of an object to be measured and is simple and inexpensive. However, since the micrometer performs measurements while the object to be measured is fixed and a probe thereof contacts the uneven surface, it takes time for the procedure. For this reason, it is so difficult to quickly detect the uneven profile of the object surface that the micrometer cannot be used in applications for detecting uneven surface profiles of objects passing in immediate succession, that is, in a coin identifying device built in a vending machine.

For example, in the coin identifying device built in a vending machine, multiple sensors are provided to collect various kinds of information about inserted coins and determine the kinds and legality of the coins. One of the sensors provided in the coin identifying device is an eddy-current sensor. The eddy-current sensor is placed to face a coin passage so that it electrically detects changes in magnetic flux when coins pass by. In other words, a specific resistance varies depending on the material and thickness of the coin, and accordingly the eddy-current loss varies in each coin. The eddy-current sensor electrically detects changes in magnetic flux caused by such an eddy-current loss, and then emits a signal. Therefore, the coin identifying device detects the material, thickness, and diameter of the inserted coin based on the changes in detection outputs of the eddy-current sensor, and also detects data based on detection outputs of other sensors. By comparing those results with the data stored in advance, the kinds and validity of the inserted coin are determined. However, such a coin identifying device is very complex and expensive.

Also, presently coins are forged more precisely, so the coin identifying device built in vending machines is required to determine the kinds and validity of coins based on the complicated and fine, uneven profile on the surfaces of the coins. That is, the development of a simple and inexpensive surface profile detecting device is demanded in which an uneven surface profile of an object to be measured can be detected with no surface contact.

As a method of detecting an uneven surface profile with no surface contact, there are methods in which an image captured by a CCD camera is processed and in which a semiconductor laser is illuminated onto an uneven surface and its reflection is captured by a photodiode. However, in the method of capturing an image in a CCD camera, since an uneven profile is processed as two-dimensional image data, fake coins on which a picture of a valid coin is attached cannot be distinguished. Also, when a light is illuminated with a shallow angle from the periphery to make it easy to optically obtain the information on the uneven profile, if the center portion of the coin is depressed, it is difficult to obtain enough reflection and the center portion becomes dark, and therefore possible to mistakenly recognize the depression as a hole. Also, in the method of capturing the reflection of the semiconductor laser by photodiode, it is necessary to scan all the surface of the coin with a laser beam. In addition, in both of these methods, rust and dirt on the uneven surface differ in each coin, causing a problem with identification. Also, to detect the uneven profile of the coin surface, an additional, expensive device used only for detecting uneven profiles needs to be provided, thus increasing manufacturing cost and enlarging the device. This is not appropriate. Therefore, in the coin identifying device, it is convenient if a conventionally equipped sensor that detects materials is developed to enable the detection of uneven profiles of coin surfaces and then the data on the uneven profiles of coin surfaces, as well as the data on the coin material, is obtained.

The development of such a surface profile detecting device is needed not only for coin identification, but also for other applications.

OBJECT AND SUMMARY OF THE INVENTION

The primary object of the present invention is to provide a surface profile detecting device that can detect an uneven surface profile of an object to be measured with no surface contact and can be manufactured simply and inexpensively.

In accordance with the invention, a surface profile detecting device comprises a plurality of bar-like cores disposed in a line with predetermined intervals in a predetermined disposing direction. Each core has tip ends that are arranged on a single plane and which face a surface of an object to be measured having recesses and protrusions in a magnetic field such that they are relatively movable in a direction orthogonal to said disposing direction. The detecting device also includes detecting means provided in each of the bar-like cores for detecting changes in magnetic flux generated due to the uneven profile of the object to be measured. An A/D converting means is provided for A/D converting the output of the detecting means with a predetermined timing. A memory is also provided for storing the output from the A/D converting means. The uneven profile of the object to be measured in a predetermined range is detected from the data stored in the memory.

BRIEF DESCRIPTION OF THE DRAWINGS

In the drawings:

FIG. 4 is a perspective view showing a part of the line sensor to describe the width, w, of a tip end of a bar-like core;

FIG. 5 is a circuit diagram of a detection signal circuit of the surface profile detecting device of FIG. 1;

FIG. 6 is a diagram of an example of an output signal of the detection signal circuit of FIG. 5;

FIG. 7 is a conceptual diagram of the detection by the line sensor of the surface profile detecting device of FIG. 1;

FIGS. 8(*a*), 8(*b*) and 8(*c*) show a manufacturing process of a core unit of the surface profile detecting device of FIG. 1: FIG. 8(*a*) is a perspective view of a ferrite block; FIG. 8(*b*) is a perspective view of the ferrite block having grooves and steps machined; FIG. 8(*c*) is a perspective view of the ferrite block having bar-like cores and supporting cores machined;

FIG. 11 is a diagram showing the sensor output of an uneven profile of a 500 yen coin when the width, w, of the tip end surface of the bar-like core is 0.5 mm;

FIG. 12 is a diagram showing the sensor output of the uneven profile of a 500 yen coin when the width, w, of the tip end surface of the bar-like core is 3 mm; FIG. 13(A) is a plan view of a 1 yen coin (object to be measured); FIG. 13(B) is a cross-sectional view of a dimension of the uneven profile of a 1 yen coin.

DESCRIPTION OF THE PREFERRED EMBODIMENTS

The configuration of the present invention will be described in detail hereinafter based on embodiments illustrated in the figures.

Figure 1:
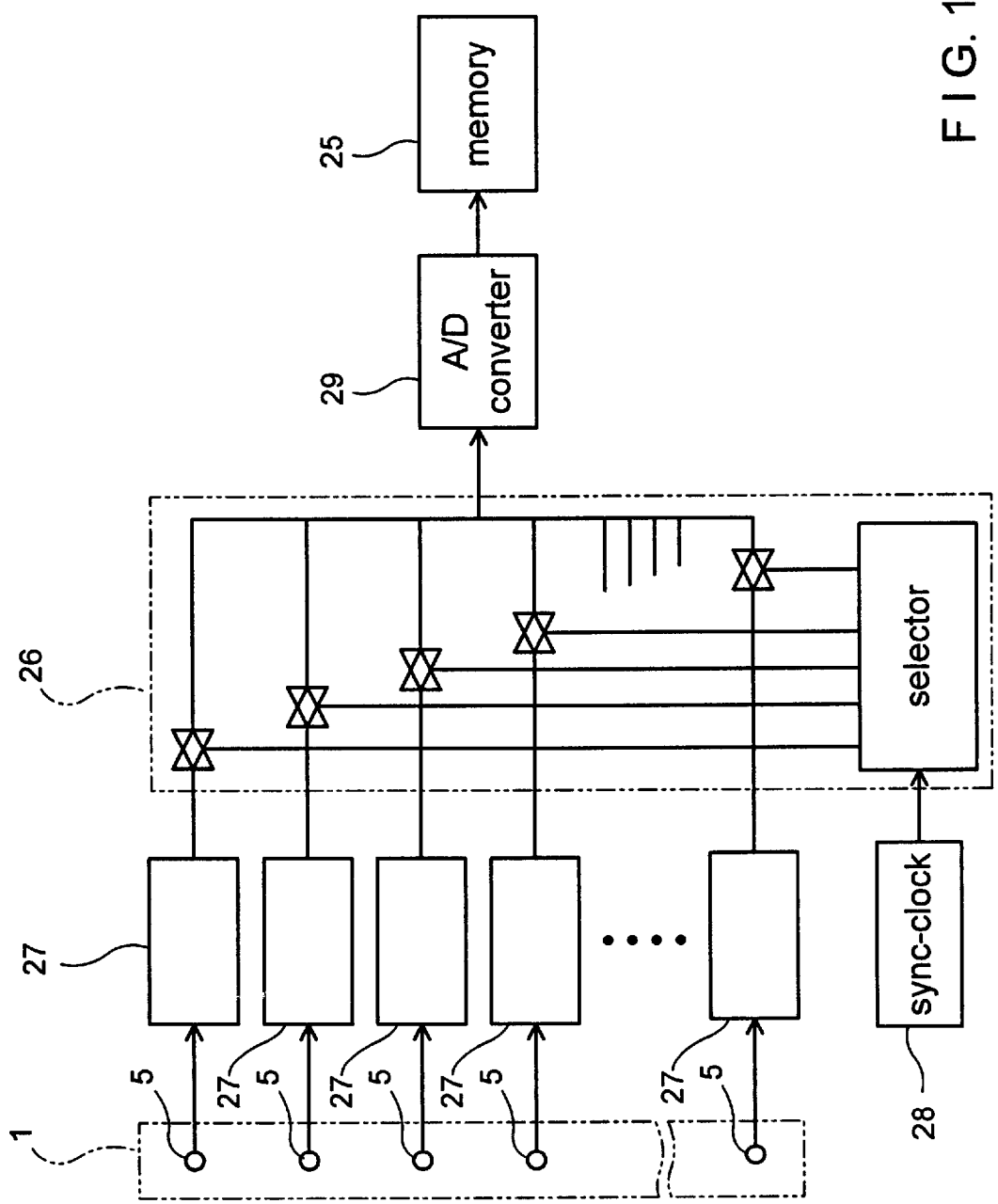
FIG. 1 shows a block diagram of a simple construction of a surface profile detecting device to which the present invention is applied.
Figure 2:
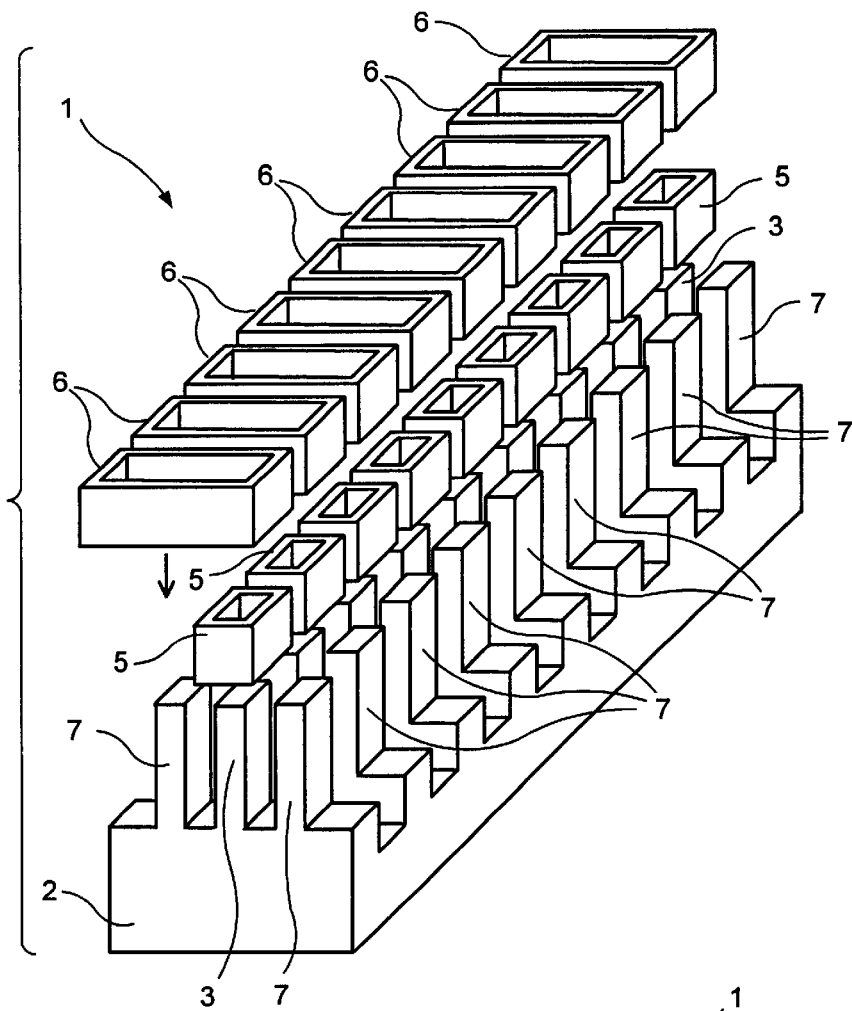
FIG. 2 shows a dissembled perspective view of a line sensor of the surface profile detecting device of FIG. 1.
Figure 3:
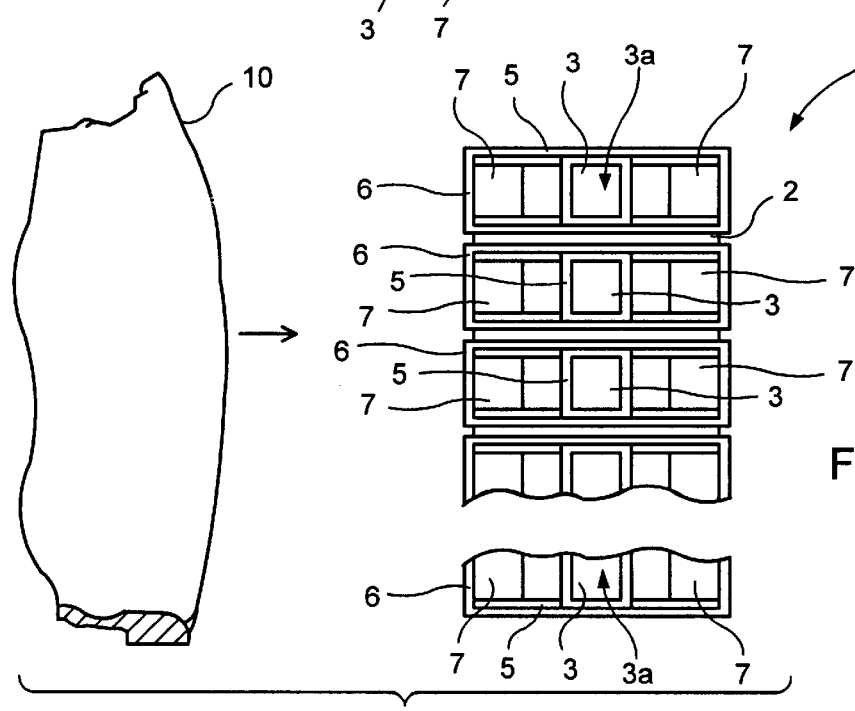
FIG. 3 is a plan view of the line sensor of the surface profile detecting device of FIG. 1.

FIGS. 1 through 3 show an example of a surface profile detecting device to which the present invention is applied. In the surface profile detecting device, tip ends of a plurality of bar-like cores 3 disposed in a line with predetermined intervals are arranged on a single plane; the tip ends of the bar-like cores 3 are positioned in the magnetic field to face a surface of an object to be measured 10 having recesses and protrusions such that they are relatively movable in the direction orthogonal to the disposing direction of the tip ends of the bar-like cores 3; a detecting means 5 is provided in each of the bar-like cores 3 for detecting changes in magnetic flux caused due to the uneven profile of the object to be measured 10; the output of the detecting means 5 is AND converted with a predetermined timing and stored in a memory 25; and the uneven profile of the object to be measured 10 within a predetermined range is detected based on the data stored in the memory 25.

The movement of the surface profile detecting device when the object to be measured 10 having recesses and protrusions and made of metallic or magnetic material is relatively moved in the direction orthogonal to the disposing direction of the tip ends of the bar-like cores 3, is now explained using one of the bar-like cores 3. As illustrated in FIG. 4, if the direction of relative movement of the object to be measured 10 is the direction of an arrow in FIG. 4, the width, w, of a tip surface 3a of the bar-like core 3 in the moving direction, that is, the length, w, of two sides of the tip end surface 3a of the bar-like core 3 along the relative movement direction is set shorter than the width of the uneven profile to be detected. For example, when the object to be measured 10 is a coin, the length, w, of the tip end surface 3a of the bar-like core 3 along the relative movement direction is set to be, for example, at most 2 mm, a smaller value than the width of the recess or protrusion of the uneven profile of the coin 10 surface to be detected. Note that the smaller value than the width of the recess or protrusion of the uneven profile to be detected does not necessarily mean to be smaller than the smallest recess or protrusion, but may be set to obtain a required resolution based on the width to be detected. When the object to be measured 10 is a coin, if the width, w, is larger than 2 mm, the resolution for detection for the uneven surface profile of the coin 10 becomes rough, making it difficult to detect the fine, uneven profile. Accordingly, the resulting resolution is poor as the data to be used for determining the validity of the coin 10, compared to the one obtained with the width of less than 2 mm. However, it is not necessary to set the width, w, less than 2 mm, but is important to set the width, w, according to the width of the uneven profile of the object to be measured 10 and the required resolution.

When the uneven profile can be detected roughly, the width, w, does not need to be set smaller than the width of the uneven profile. It will be no problem even if the width, w, is nearly the same as or even slightly larger than the width of the uneven profile as long as the required resolution is satisfied.

Figure 13A:
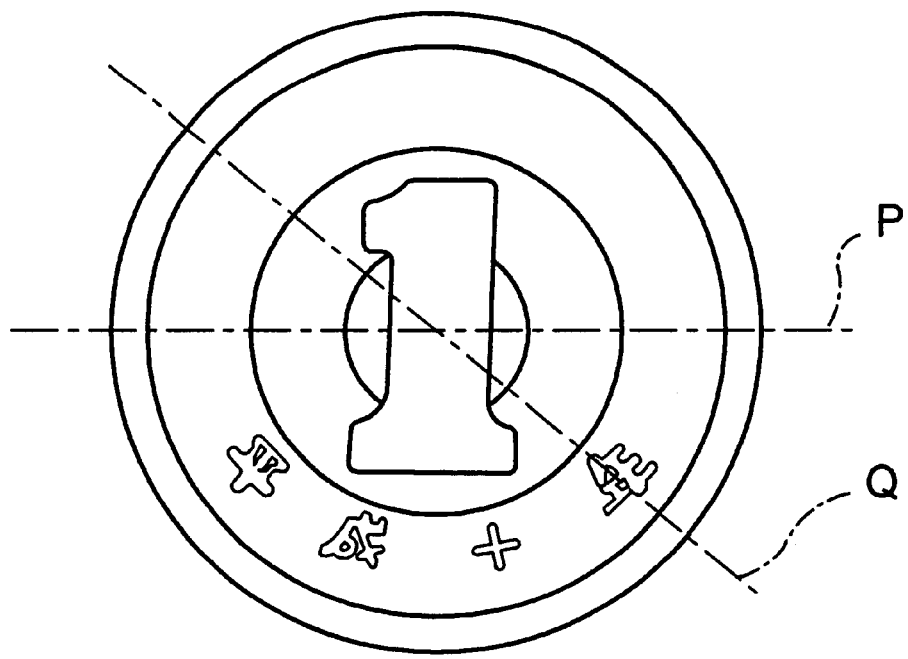
FIGS. 13(A) and 13(B) describe the relationship between the width, w, of the tip end surface of the bar-like core and the width of the uneven profile of the object to be measured.
Figure 13B:
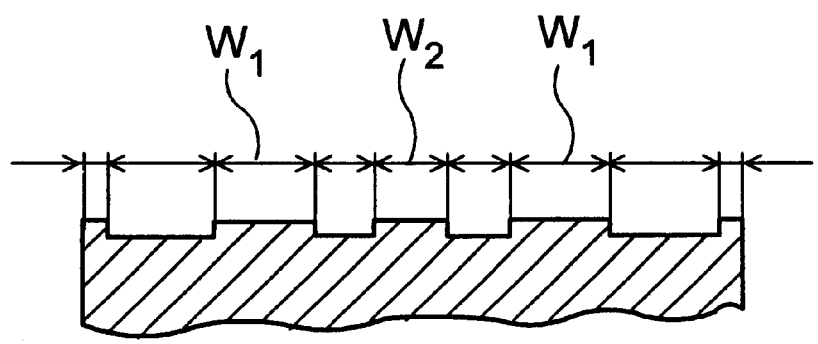

In many cases, the widths of recesses and protrusions are various in the uneven profile of the object to be measured 10. Generally, it is preferred to set the width, w, of the bar-like core 3 based on the smallest width in the uneven profile. For example, when detecting the uneven profile of a 1 yen coin (made of aluminum) illustrated in FIG. 13(A), since the smallest width of the uneven profile to be detected, except for fine characters, is the protrusion of the outer periphery as illustrated in 13 (B), the width, w, is set based on the protrusion of the outer periphery. By setting the width, w, to be a smaller value than the smallest width, the entire uneven profile can be detected. With this, even when the relative movement path of the bar-like core 3 is, for example, on P-line or Q-line in FIG. 13(A), the uneven profile can be detected excellently. However, the width, w, is not necessarily set smaller than the protrusion of the outer periphery. But, for example, when detecting not the profile of the protrusion of the outer periphery but the uneven profile in a pattern, the width, w, of the bar-like core 3 may be set smaller than the most smallest width of the uneven profile in the pattern to be detected. In FIG. 13(B), the width, w, of the bar-like core 3 may be set smaller than the width of the uneven profile to be detected, that is, the widths, W1 and W2 of protrusions, for example. In other words, how wide the uneven profile is measured should be first determined, and then [the width, w,] may be set smaller than the determined width. In this case, while the recesses and protrusions having the widths that one wants to detect can be clearly measured, it is still possible to obtain even the profile of the recesses and protrusions having narrow widths that do not need to be detected.

The detecting means 5 is, for example, a detecting coil wound around the bar-like core 3. A supporting core 7 for creating a magnetic flux path, which has the same width as the bar-like core 3, is integrally formed at both sides of the bar-like core 3 with the same number as the bar-like cores 3 in the relative movement direction. An exiting coil 6 is wound around the supporting cores 7 at both sides. Note that the supporting core 7 does not need to be formed at both sides of the bar-like core 3, but may be formed on either one side of the bar-like core 3. Also forming the supporting core 7 at both sides may be omitted. In this case, the exciting coil 6 may be wound around the bar-like core 3.

As illustrated in FIG. 5, a high frequency signal 14 is applied as an exciting signal to each exciting coil 6 to generate a magnetic field in the space in which the object to be measured 10 moves relatively. When the object to be measured 10 containing metallic portions passes through the magnetic field, the magnetic flux changes. The magnitude of the changes in magnetic flux varies depending on the distance between the tip end surface 3a of the bar-like core 3 and the object to be measured 10 or the metallic material of the object to be measured 10. Therefore, the output from the detecting coil 5 varies according to the uneven surface profile or material of the object to be measured 10. The output from each detecting coil 5 is first amplified by an amplifier circuit 11 of a signal detection circuit 27, and then half-wave rectified by a phase detection circuit 12 and a peak-hold circuit 13 to become an analog signal having a waveform corresponding to the uneven profile of the object to be measured 10. Note that the order of amplification and wave detection can be reversed. As illustrated in FIG. 1, the analog signals of all the detecting coils 5 are supplied to an analog multiplexer 26. The analog multiplexer 26 supplies the analog signal of each detecting coil 5 in sequence to an A/D converter 29 with a predetermined timing based on the pulse from a sync-clock 28. A digital signal converted by the A/D converter 29 is stored in the memory 25 in sequence. Note that, when the object to be measured 10 is made of metal, an eddy-current generated in the object to be measured 10 reduces the magnetic flux acting oil the bar-like core 13; therefore, the output signal of the detecting coil 5 changes. Also, when the object to be measured 10 is made of magnetic material, the leakage of the magnetic flux from the object to be measured 10 is decreased; therefore, the output signal of the detecting coil 5 changes. Consequently, in the surface profile detecting device of the present invention, the uneven surface profile can be detected even when the object to be measured 10 is made of not only metal, but also magnetic material.

In the surface profile detecting device, each of the cores 3, 7 and each of the coils 5, 6 are arranged with spaces in a line in the direction orthogonal to the relative movement direction to compose a line sensor 1. The line sensor 1 is positioned so that the object to be measured 10 relatively moves in the magnetic field to be generated by each exciting coil 6. For example, when the line sensor 1 is used as a coin identifying sensor which is built, for example, in a coin identifying device in a vending machine, it is located in the vicinity of the coin passage so that coins pass through the magnetic field generated by each exciting coil 6.

Attention is drawn to the detecting coil 5 provided for the bar-like core 3 and located in the center of the line sensor 1 in the longitudinal direction, that is, the detecting coil 5 is provided for the bar-like core 3 and faces the center position of the coin 10 as an object to be measured when the coin 10 relatively moves. From the signal detection circuit 27 corresponding to the detecting coil 5, the output signal illustrated in FIG. 6, for example, is obtained as the coin moves relatively. The output signal becomes low at the protrusions of the coin 10 and high at the recesses. Before the coin 10 faces the bar-like core 3, the output is even higher than that at the recesses. Even if there is a hole on the way, the higher (such as same) output can be still obtained. In other words, while the waveform of the output signal corresponds to the uneven profile of the coin 10 surface, the information 21 on the height difference between the periphery and the center portion of the coin 10, the information 22 on the periphery width, the information 23 on the diameter, and the information 24 on the material and thickness can be obtained simultaneously. Therefore, when used as a coin identifying sensor, the line sensor 1 can detect the information 21 through 24 in addition to the information on the uneven surface profile.

In the above manner, from each of the detection signal circuits 27 connected to the detecting coils 5 constituting the line sensor 1, the analog signal having the waveform corresponding to the uneven profile of the coin 10 surface along the relative movement path of the bar-like core 3 that corresponds to each of the detecting coil 5, is respectively emitted. The output signal of each signal detection circuit 27 is A/D converted in sequence by the analog multiplexer 26 and the A/D converter 29 with a predetermined timing and stored in the memory 25. In other words, as illustrated by circle in FIG. 7, if the coin 10 and the line sensor 1 are once moved relatively, the data on the uneven profile of the coin 10 surface is sampled in discrete time (in mesh) to detect the entire coin 10 surface. That is, the uneven profile within the range of the relative movement of the line sensor 1 is detected. Note that using the line sensor 1 as a coin identifying sensor is an example. It should be understood that the line sensor 1 is not limited to the application of coin identification.

If the output of the line sensor 1 is used in the above manner, with a one time relative movement of the coin 10 and the line sensor 1, the data on the uneven profile of the coin 10 surface is sampled in discrete time (in mesh) as illustrated by circle in FIG. 7, and the entire surface of the coin 10 can be detected. However, if necessary, even if the detection signal from each detecting coil 5 constituting the line sensor 1 is detected at the moment the center portion of the coin 10 passes by the line sensor 1 or by temporarily stopping the movement of the coin 10 at that time, the detection result of the uneven profile of the center portion of the coin in the vertical direction can be obtained. According to the detection result of the uneven profile obtained at this time, the vertical uneven profile passing through the center of the coin can be detected in FIG. 13(A).

Also, the line sensors 1 may be arranged in multiple in the horizontal direction and be adjacent to each other so that the entire area to be detected is covered or a larger area than the coin 10 is formed; when a predetermined portion or the entire portion of the coin 10 comes into the area, the movement of the coin is stopped to detect the detection signal from each detecting coil 5 constituting the line sensor 1. In this manner, the entire surface of the coin 10 can be detected even in the stop status. At this time, if the line sensors arranged in multiple in the horizontal direction are alternately shifted one by one, the entire uneven profile can be evenly detected.

In the surface profile detecting device of this embodiment, the line sensor 1 is constituted by integrally forming a plurality of bar-like cores 3 and supporting cores 7 from a rectangular parallelepipedic ferrite block 18. That is, as illustrated in FIG. 8, grooves 18a and steps 18b are first machined in the ferrite block illustrated in (a) in the longitudinal direction, as illustrated in (b). Next, a predetermined number of grooves 18c are machined with appropriate intervals in the ferrite block 18 to manufacture a core unit 2 as illustrated in (c), in which each bar-like core 3 and each supporting core 7 are formed as a single entity. By integrally forming multiple bar-like cores 3 and supporting cores 7 with machining, a base portion can be constructed as a united single block so that multiple bar-like cores 3 and supporting cores 7 can be accurately positioned by predetermined intervals.

Figure 9:
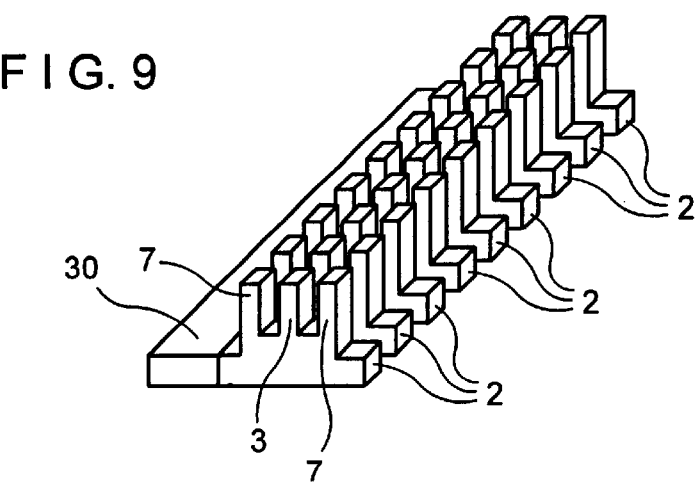
FIG. 9 is a perspective view showing another embodiment of the core unit of the surface profile detecting device of FIG. 1.

However, it is not necessary to integrally form each bar-like core 3 and each supporting core 7 from the single ferrite block 18. A predetermined number of bar-like cores 3 and supporting cores 7 may be formed in a ferrite block 18 shorter than the ferrite block of FIG. 8(a) and a plurality of ferrite blocks 18 be joined to constitute the line sensor 1 of a predetermined length. Otherwise, as illustrated in FIG. 9, a core unit 2 having one bar-like 3 and two supporting cores 7 may be prepared in multiple, and they may be bonded, for example, on a ceramic plate 30 to make them a single entity and constitute the line sensor 1.

Note that, although the above embodiment is a preferable example of the present invention, the present invention is not limited to this, but can be variously modified within the scope of the invention.

For example, the coin is used as an object to be measured in the above description. However, the present invention can detect uneven surface profiles of various objects made of metal or magnetic material.

Figure 10:
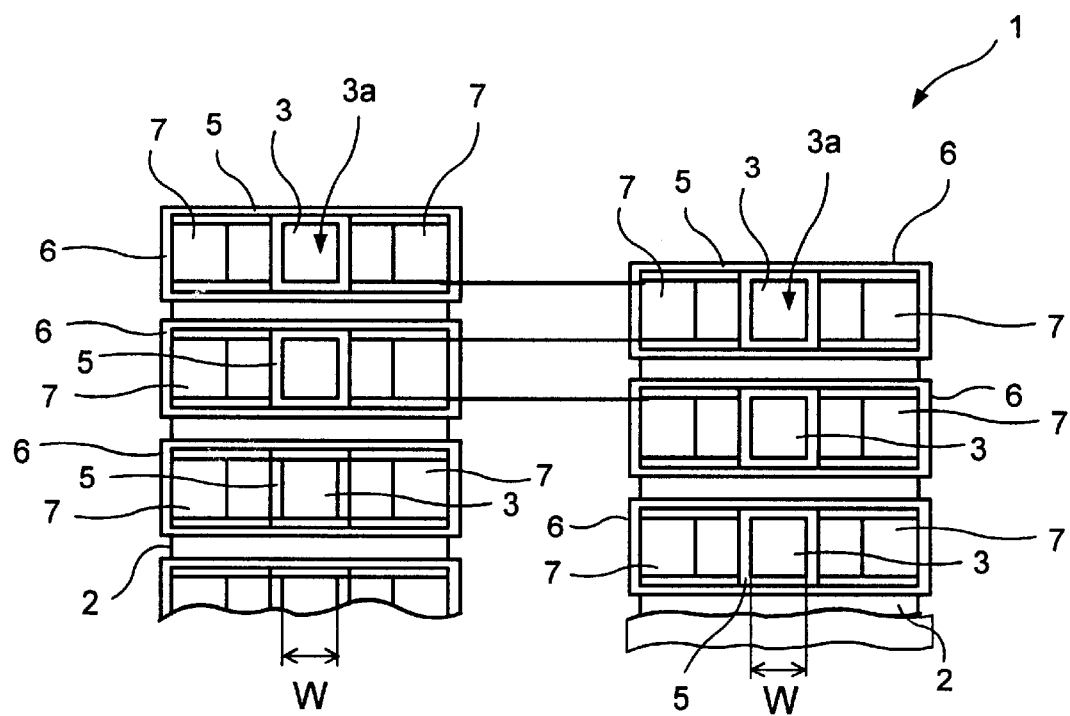
FIG. 10 is a plan view showing that the bar-like cores of the surface profile detecting device of FIG. 1 are arranged in two rows.

Also, although the bar-like cores 3 are disposed in a line to constitute the line sensor 1, the bar-like cores 3 may be arranged in multiple lines to constitute the line sensor 1. In other words, a plurality of the bar-like cores 3 disposed in a line with intervals are arranged in multiple pairs in the relative movement direction of the object to be measured 10; the bar-like cores 3 in the back row in the relative movement direction may be positioned to be in the intervals between the bar-like cores 3 in the front row. FIG. 10 shows this positioning: a plurality of the bar-like cores 3 disposed in a line with intervals are, for example, arranged in two pairs in the relative movement direction of the object to be measured 10; the bar-like cores 3 in the second row are positioned to be between the bar-like cores 3 in the first row. Since the bar-like cores 3 in the first row and those in the second row are alternately arranged, the relative movement path of the bar-like cores 3 in each row will not overlap. Therefore, the number of the bar-like cores 3 may be increased to detect the surface profile of the object to be measured 10 intensely. For example, even when the interval between the bar-like cores 3 in a line cannot be made narrow due to structural or machining restrictions or even when the interval between the bar-like cores 3 needs to be widened to prevent magnetic interference of the neighboring detecting cores 5, the rows of the bar-like cores 3 may be increased to intensely detect the object to be measured 10 in the relative movement path of the bar-like cores 3.

In the above description, the detecting means is the detecting coil 5 wound around the bar-like core 3. However, a magnetoresistance element for detecting changes in magnetic flux caused with the uneven profile may be mounted to the bar-like cores 3 in place of the detecting coil 5.

Although the two coils, i.e., the detecting coil 5 and the exciting coil 6 are contained in the above description, it is not necessary to contain the two coils 5, 6, but these coils may be combined in one coil. In this case, the excitation is caused by one coil and a circuit is configured to detect inductance change in the coil. Changes in the magnetic flux may be detected based on the detection result,.

Further, the signal to be applied on the exciting coil 6 is not necessarily limited to a high frequency signal, but a signal responsive to the object to be measured or the resolution for the detection of the object may be used. However, when the line sensor is used as a coin identifying sensor, it is preferred to use alternating signals of 1 KHz to 10 MHz frequency. With less than 1 KHz, the data for determining the kinds and validity of the coin will be poor in resolution. With over 10 MHz, the impedance increases, making it difficult to drive the sensor or increasing noise generated between signal wirings that do not interpose the magnetic circuit.

Next, to examine the relationship between the width, w, of the tip end surface 3a of the bar-like core 3 and the resolution of the uneven profile detection, an experiment is made on detecting a surface profile of a 500 yen coin (made of nickel) changing the value of the width, w. With the width, about 1 mm, of the recess and protrusion to be detected, FIG. 11 shows the waveform of the output signal of the detecting coil 5 when the width, w, is 0.5 mm, and FIG. 12 shows the waveform of the output signal of the detecting coil 5 when the width, w, is 3 mm. When the width, w, is 3 mm (FIG. 12), the waveform of the output signal is flat overall. Although it is possible to detect the information 21 on the height difference between the periphery and center portion of a 500 yen coin (see FIG. 6), the information 23 on the dimension, and the information 24 on the thickness of the material, it is difficult to detect the uneven surface profile. On the other hand, when the width, w, is 0.5 mm (FIG. 11), the changes in the form of the output signal is excellently responsive to the changes in the surface profile of a 500 yen coin. With these consequences, it is understood that the smaller the width, w, is, the better the feature of the finer uneven profile can be detected. Also, by setting the width, w, to be 0.5 mm, the line sensor 1 can obtain sufficient resolution to be used as a sensor for determining the kinds and validity of the coin.

As described above, in the surface profile detecting device of the present invention, tip ends of a plurality of bar-like cores disposed in a line with predetermined intervals are arranged on an single plane and positioned in a magnetic field to face a surface having recess and protrusion of an object to be measured such that they are relatively movable in the direction orthogonal to the disposing direction; a detecting means is provided in each of the bar-like cores for detecting changes in the magnetic flux generated due to the uneven profile of the object to be measured; the output of the detecting means is A/D converted with a predetermined timing and stored in a memory; and the uneven profile in a predetermined range is detected from the data stored in the memory. Thus, the detecting means configures the line sensor and the uneven profile of the entire surface of the object to be measured can be detected in a one-time scan with no surface contact. Also, since the detecting means is provided in each of the bar-like cores disposed in a line to detect changes in the magnetic flux, the structure of the line sensor is simplified, thus reducing the manufacturing cost.

Also, the tip ends of a plurality of the bar-like cores disposed in a line with predetermined intervals are arranged on a single plane and positioned in the magnetic field to face a surface having recesses and protrusions, and the detecting means for detecting changes in the magnetic flux generated due to the uneven profile of the object to be measured is provided in each of the bar-like cores, and the uneven profile in a predetermined range is detected from the output of the detecting means. Therefore, the uneven surface profile of the object to be measured can be detected without contacting and with a simple configuration.

While the foregoing description and drawings represent the preferred embodiments of the present invention, it will be obvious to those skilled in the art that various changes and modifications may be made therein without departing from the true spirit and scope of the present invention.

What is claimed is:

1. A surface profile detecting device comprising:
a plurality of bar-like cores disposed in a line with predetermined intervals in a predetermined disposing direction orthogonal to the direction of movement of an object to be measured, each having bar-like core tip ends that are arranged on a single plane and which directly face a surface of said object to be measured having an uneven profile comprising recesses and protrusions which are affected by a magnetic field generated by a plurality of adjacent supporting cores wherein supporting core tip ends are disposed in the same direction as the bar-like core tip ends; and wherein said supporting cores are wound around with an exciting coil for creating said magnetic field wherein said supporting core tip ends directly face the surface of said object and said supporting cores are integrally formed with said bar-like cores wherein said supporting core tip ends and said bar-like core tip ends of each integrally formed supporting core and bar-like core are only arranged in the direction of the relative movement of said object; and a plurality of signal detection circuits, each signal detection circuit connected with a magenetic detector wherein each of said signal detection circuits is connected to an A/D converter:

said magnetic detector provided with each of said bar-like cores for detecting changes in magnetic flux generated due to said uneven profile of said object to be measured;

said A/D converter for A/D converting an output of each of said signal detection circuits with a predetermined timing; and a memory for storing an output from said A/D converter, said uneven profile of said object to be measured in a predetermined range being detected from the data stored in said memory.

2. The surface profile detecting device as set forth in claim 1 wherein the width of a tip end of said bar-like core in said relative movement direction is set smaller than the width of said uneven profile of said object to be measured, which is an object to be detected, and wherein said magnetic detector is a detecting coil wound around said bar-like core.

3. The surface profile detecting device as set forth in claim 1 wherein the width of a tip end of said bar-like core in said relative movement direction is set smaller than the width of said uneven profile of said object to be measured, which is an object to be detected, and wherein said magnetic detector is a magnetoresistance element mounted to said bar-like core.

4. The surface profile detecting device as set forth in claim 2 wherein a plurality of said bar-like cores disposed in a line with intervals are arranged in multiple rows in said relative movement direction, and wherein each bar-like core in the back row of said relative movement direction is arranged in the position between adjacent bar-like cores in the front row.

5. The surface profile detecting device as set forth in claim 3 wherein a plurality of said bar-like cores disposed in a line with intervals are arranged in multiple rows in said relative movement direction, and wherein each bar-like core in the back row of said relative movement direction is arranged in the position between adjacent bar-like cores in the front row.

6. The surface profile detecting device as set forth in claim 1, wherein said supporting cores comprise supporting cores being arranged at both sides of each of said bar-like cores in said relative movement direction, having the same width as said bar-like core and being integrally formed with said bar-like cores.

7. The surface profile detecting device as set forth in claim 6 wherein said bar-like cores and said supporting cores are integrally formed from a single magnetic block, and said object to be measured is made of metallic or magnetic material.

8. The surface profile detecting device as set forth in claim 6 wherein an exciting coil is wound around each of said bar-like cores or said supporting cores, to which a high frequency signal is applied.

9. The surface profile detecting device as set forth in claim 8 wherein said object to be measured is a coin, and the width of said tip end of said bar-like core in said relative movement direction is at most 2 mm.

10. A coin-identifying device comprising:

a plurality of bar-like cores disposed in a line with predetermined intervals in a predetermined disposing direction orthogonal to a direction of movement of a coin to be identified, each having bar-like core tip ends which directly face a surface of said coin to be identified having recesses and protrusions in a magnetic field and being arranged on a single plane;

wherein said recesses and protrusions are affected by said magnetic field which is generated by a plurality of adjacent supporting cores wherein supporting core tip ends are disposed in the same direction as the bar-like core tip ends; and wherein said supporting cores are wound around with an exciting coil for creating said magnetic field wherein said supporting core tip ends directly face the surface of said object and said supporting cores are integrally formed with said bar-like cores wherein said supporting core tip ends and said bar-like core tip ends of each integrally formed supporting core and bar-like core are only arranged in the direction of the relative movement of said coin; and a magnetic detector provided in each of said bar-like cores for detecting changes in magnetic flux generated due to an uneven profile of said coin to be identified, said uneven profile of said coin to be identified in a predetermined range being detected from an output of said magnetic detector wherein said magnetic detector faces said coin.

11. The coin-identifying device as set forth in claim 10 wherein the width of said tip end of said bar-like core is set smaller than the width of a recess portion or protrusion portion of said coin to be measured and wherein said magnetic detector is a detecting coil wound around said bar-like core.

12. The coin-identifying device as set forth in claim 10 wherein the width of said tip end of said bar-like core is set smaller than the width of a recess portion or protrusion portion of said object to be measured, which is an object to be detected, and wherein said magnetic detector is a magnetoresistance element mounted to said bar-like core.

13. The coin-identifying device as set forth in claim 11 wherein a plurality of said bar-like cores disposed in a line with intervals are arranged in multiple rows, and wherein said uneven profile is detected by said magnetic detector in a predetermined range defined by said predetermined disposing direction and said arrangement direction of said multiple rows.

14. The coin-identifying device as set forth in claim 12 wherein a plurality of said bar-like cores disposed in a line with intervals are arranged in multiple rows, and wherein said uneven profile is detected by said magnetic detector in a predetermined range defined by said predetermined disposing direction and said arrangement direction of said multiple rows.

15. The coin-identifying device as set forth in claim 13 wherein said predetermined range created by arranging a plurality of said bar-like cores, which are disposed in a line with intervals, in multiple rows is set larger than the dimension of said coin to be measured.

16. The coin-identifying device as set forth in claim 14 wherein said predetermined range created by arranging a plurality of said bar-like cores, which are disposed in a line with intervals, in multiple rows is set larger than the dimension of said coin to be measured.

17. The surface profile detecting device as set forth in claim 10 further comprising supporting cores for creating a magnetic flux path, said supporting cores being arranged at both sides of each of said bar-like cores, having the same width as said bar-like core, and being integrally formed with said bar-like cores.

18. The surface profile detecting device as set forth in claim 17 wherein an exciting coil is wound around each of said bar-like cores or said supporting cores, to which a high frequency signal is applied.

* * * * *